United States Patent
Monnier et al.

(10) Patent No.: US 9,752,922 B2
(45) Date of Patent: *Sep. 5, 2017

(54) SCALE WITH AUTOMATIC OFFLINE INDICATION AND RELATED METHOD

(75) Inventors: Carla A. Monnier, Vandalia, OH (US); Mark Edward Eberhardt, Jr., Troy, OH (US); David Scott Miller, Troy, OH (US); James Carl Meyer, Troy, OH (US)

(73) Assignee: PREMARK FEG L.L.C., Glenview, IL (US)

( * ) Notice: Subject to any disclaimer, the term of this patent is extended or adjusted under 35 U.S.C. 154(b) by 1554 days.

This patent is subject to a terminal disclaimer.

(21) Appl. No.: 12/982,387

(22) Filed: Dec. 30, 2010

(65) Prior Publication Data

US 2011/0099504 A1    Apr. 28, 2011

Related U.S. Application Data

(63) Continuation of application No. 11/633,240, filed on Dec. 4, 2006, now Pat. No. 7,886,230.

(51) Int. Cl.
| | |
|---|---|
| *G06F 3/048* | (2013.01) |
| *G01G 19/414* | (2006.01) |
| *G01G 23/37* | (2006.01) |
| *G07G 1/01* | (2006.01) |
| *G07G 3/00* | (2006.01) |

(52) U.S. Cl.
CPC ...... *G01G 19/4144* (2013.01); *G01G 23/3728* (2013.01); *G01G 23/3735* (2013.01); *G07G 1/01* (2013.01); *G07G 3/00* (2013.01); *G07G 3/006* (2013.01)

(58) Field of Classification Search
USPC .......................... 715/764, 771, 772
See application file for complete search history.

(56) References Cited

U.S. PATENT DOCUMENTS

| | | | |
|---|---|---|---|
| 4,325,441 A | 4/1982 | Nakatani et al. | |
| 4,779,706 A | 10/1988 | Mergenthaler | |
| 4,901,237 A | 2/1990 | Hikita et al. | |
| 5,515,301 A | 5/1996 | Corby et al. | |
| 5,747,784 A | 5/1998 | Walter et al. | |
| 5,752,582 A | 5/1998 | Hayward | |
| 5,952,642 A | 9/1999 | Lutz et al. | |
| 6,054,982 A | 4/2000 | Kikuchi et al. | |
| 6,566,613 B1 * | 5/2003 | Gesuita et al. | 177/25.18 |
| 6,580,037 B1 * | 6/2003 | Luke | 177/25.13 |
| 6,960,730 B2 * | 11/2005 | Lawler et al. | 177/25.15 |
| 7,010,292 B2 | 3/2006 | Jerbi et al. | |
| 7,612,302 B2 * | 11/2009 | Tamkin et al. | 177/25.15 |
| 7,872,201 B1 * | 1/2011 | Whitney | 177/25.13 |
| 7,886,230 B2 * | 2/2011 | Monnier et al. | 715/736 |

(Continued)

FOREIGN PATENT DOCUMENTS

| | | |
|---|---|---|
| EP | 1098278 A2 | 5/2001 |
| EP | 1359527 A2 | 11/2003 |

(Continued)

*Primary Examiner* — David Phantana Angkool
(74) *Attorney, Agent, or Firm* — Thompson Hine LLP

(57) ABSTRACT

A scale and associated method automatically identify when a food product pricing scale is in an offline condition and changes a color condition on the scale display to alert scale operators of the offline condition.

14 Claims, 4 Drawing Sheets

(56) References Cited

U.S. PATENT DOCUMENTS

| | | | |
|---|---|---|---|
| 7,904,187 B2* | 3/2011 | Hoffberg et al. | 700/83 |
| 7,966,078 B2* | 6/2011 | Hoffberg et al. | 700/17 |
| 8,304,668 B2* | 11/2012 | Collins et al. | 177/25.13 |
| 8,583,263 B2* | 11/2013 | Hoffberg et al. | 700/17 |
| 8,606,540 B2* | 12/2013 | Haisty et al. | 702/157 |
| 2003/0182014 A1 | 9/2003 | McDonnell et al. | |
| 2003/0182230 A1 | 9/2003 | Pessin | |
| 2004/0089482 A1 | 5/2004 | Ramsden et al. | |
| 2005/0003893 A1 | 1/2005 | Hogwood et al. | |
| 2005/0021371 A1 | 1/2005 | Basone et al. | |
| 2006/0166654 A1 | 7/2006 | Ackermann-Markes | |
| 2006/0270398 A1 | 11/2006 | Nakamura et al. | |
| 2007/0044539 A1 | 3/2007 | Sabol et al. | |
| 2007/0217796 A1 | 9/2007 | German et al. | |
| 2008/0141138 A1* | 6/2008 | Kalaboukis et al. | 715/741 |
| 2008/0183814 A1* | 7/2008 | Sanghavi | 709/204 |
| 2008/0194275 A1* | 8/2008 | Koch et al. | 455/457 |
| 2009/0244000 A1* | 10/2009 | Thompson et al. | 345/156 |
| 2010/0199340 A1* | 8/2010 | Jonas et al. | 726/8 |
| 2011/0099504 A1* | 4/2011 | Monnier et al. | 715/772 |

FOREIGN PATENT DOCUMENTS

| | | |
|---|---|---|
| EP | 1359527 A3 | 4/2004 |
| EP | 1098278 A3 | 3/2006 |

\* cited by examiner

SCALE WITH AUTOMATIC OFFLINE INDICATION AND RELATED METHOD

TECHNICAL FIELD

The present application relates generally to networked scales used to weigh food products in supermarkets, and more particularly to a scale that provides a clear indication for operators when the scale goes offline.

BACKGROUND

Scales have been used in stores such as supermarkets and groceries to weigh and price food items and to generate a pricing label for such food items. A typical store includes multiple scales located in multiple perishables departments. It is important that weighed items be priced properly and therefore scales are commonly connected into a store network so that the latest pricing information can be provided to the scales in a timely manner. Various types of scale networks exist. The product pricing offered by any given scale is only as accurate as the last pricing updates provided to the scale through the network, and therefore an issue arises when a scale drops offline of the network for some reason as the scale may not receive updated pricing information. Scale operators may not recognize the potential problem in such cases.

SUMMARY

In one aspect, a method of alerting scale operators within a store that a food product pricing scale is in an offline condition is provided where the scale includes a weighing station having an associated mechanism for producing weight indicative signals, and an operator interface screen including at least one color display, the scale further including a communications interface for communicating with another computer device. The method involves changing a color condition of the color display as between online and offline conditions of the scale.

In another aspect, a method is provided in connection with a food product scale located in a store, the scale including a weighing station having an associated mechanism for producing weight indicative signals, and an operator interface screen including at least one color display, and the scale further including a communications interface for communicating with another computer device. The method provides an operator with an indication that the scale has gone offline and involves changing a color condition of at least a portion of the color display as between online and offline conditions of the scale.

In yet another aspect, a scale for use in weighing food products includes a weighing station for receiving food products to be weighed, the weighing station having an associated mechanism for producing weight indicative signals. A controller receives weight indicative signals from the mechanism and is operable to establish a price for a weighed food product based in part upon a weight indicative signal produced for that food product. A communications interface is provided for connecting the controller with another computer device. An operator interface includes an operator display, the controller connected with the operator display for control thereof. The controller is operable to monitor the communications interface to determine an online or offline status of the scale. While the scale is online the controller controls the operator display so as to present a portion of a visual interface in a first color. While the scale is offline the scale controls the operator display so as to present the portion of the visual interface in a second color that is different than the first color.

In a further aspect, one or more of a visual and/or audio indication is used in connection with a food product weighing scale in a store to alert scale operators to an offline condition of the scale.

DETAILED DESCRIPTION

Figure 1:
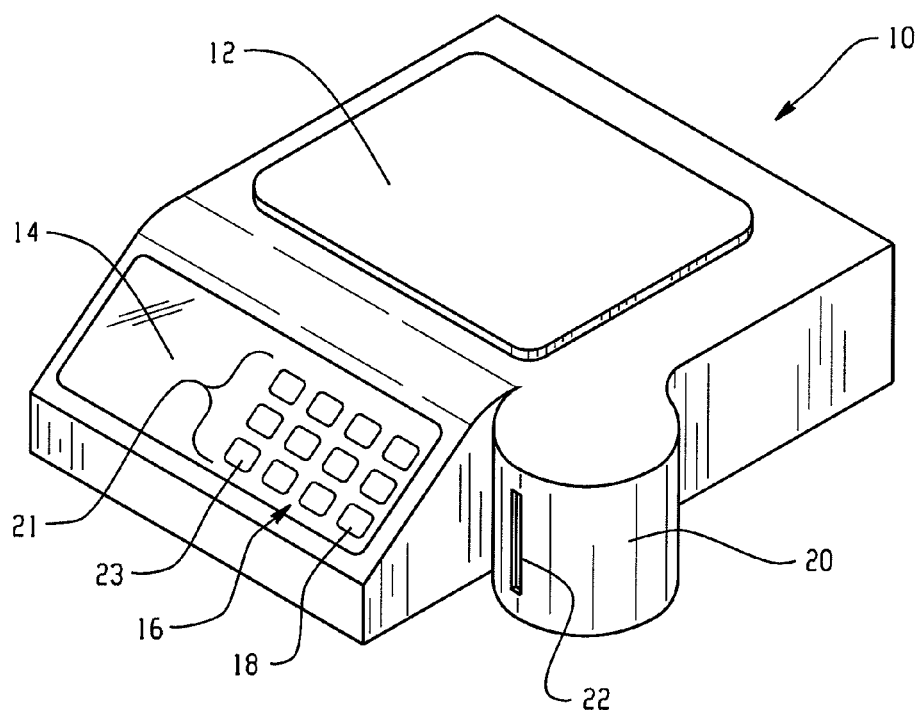
FIG. 1 is a perspective view of an exemplary food product scale.

Referring to FIG. 1 an exemplary scale 10 is shown including a weigh station 12 and a display 14. Weigh station 12 may take the form of a platter-type member supported in relationship to a load cell (internal of the scale housing) that produces a weight indicative signal when a food item is placed on the weigh station 12 for weighing. Illustrated display 14 may take the form of an LCD-type display, but other technologies could be used. In the illustrated embodiment the display 14 is a touch screen-type display that also functions as a user input device 16 by displaying image buttons/icons 18 that can be triggered or selected by an operator. The buttons/icons 18 allow for user selection of an item to be weighed from a menu or group 21 of items 23 presented to the user by display 14. In one variation the group 21 may be a numeric keypad allowing manual entry of product numbers. In another variation the group 21 may be images of specific products that might be weighed by the scale. A separate operator input device could also be provided, for example, in the form of manually activated keys/buttons located alongside the display 14. A side portion 20 of the scale housing holds a label printer and associated supply of labels, which are dispensed through a label slot 22 in the housing. Although display screen 14 is shown incorporated into the housing of the scale 10, the display could take the form of a marquee-type display located on a support extending upward from the scale housing. In some implementations (e.g., a scale weigh and label system associated with a package wrapping machine for prepack) the display need not be attached to the scale/printer via a support but could be a separately housed console that is logically attached to the scale/printer.

Figure 2:
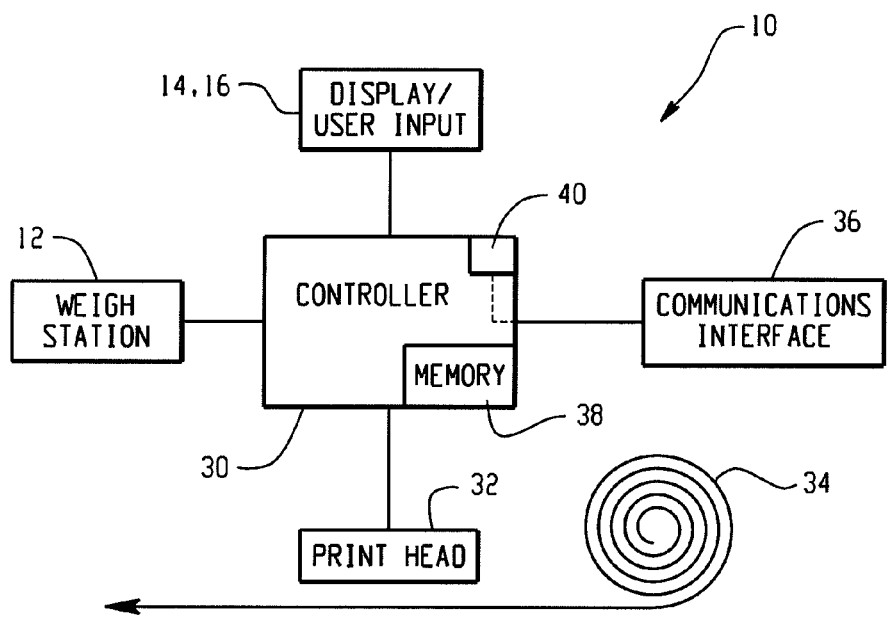
FIG. 2 is a schematic view of the scale of FIG. 1.

Referring now to FIG. 2, an exemplary schematic of the scale 10 is shown. The scale includes a controller 30, such as a microprocessor based unit, connected to control the display 14 and user input 16 and connected to receive weight indicative signals from the weighing station 12. A print head 32 and associated supply of label stock 34 that can be moved past the print head 32 is also shown. In one example the print head 32 may be a thermal print head for use with thermally activated label stock. However, other types of printing technologies and label media could also be used. The controller 30 is also connected with a communications interface 36, which may take the form of a standard connector (and associated circuitry) for a USB, RS-232, Ethernet or other hard-wired communication line. In another example the communications interface 36 may be formed by a wireless communication device such as an RF transceiver. The illustrated controller 30 includes associated memory 38 for storing product information (e.g., product names, characteristics and pricing stored in association with corresponding product numbers).

Figure 3:
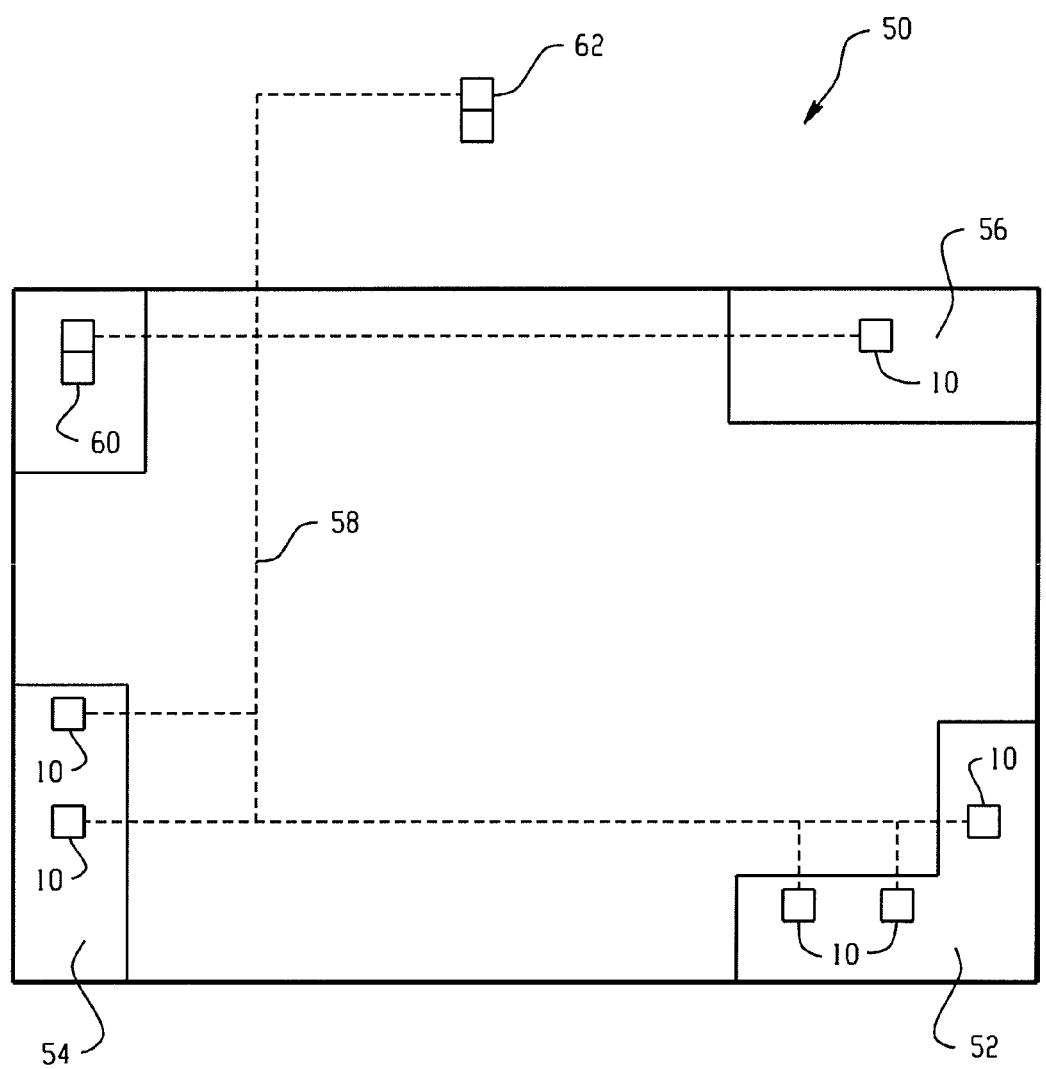
FIG. 3 is a schematic of multiple scales within a store.

Referring also to FIG. 3, an exemplary store plan 50 is shown with multiple scales 10 in various store perishables departments 52, 54 and 56 (e.g., such as the deli department, the meat and fish department, the bakery department and/or the fruit and vegetable departments), each scale connected to a network 58 for communicating with one of the other scales 10 and/or for communicating a store computer, which may be located in the store as indicated by computer 60 or at a site remote from the store as indicated by computer 62. In a typical store application, each scale receives product information updates (e.g., price changes etc.) via the network connection so that the scales are capable of pricing products accurately. The scales may receive the price information directly from a store computer 60 or 62 or may receive price updates from one of the other scales. If a scale goes offline for some reason and fails to receive the latest price updates, subsequent use of that scale may result in the use of inaccurate pricing data and thus incorrect pricing of one or more products weighed by the scale.

Referring back to FIG. 2, the scale controller 30 includes a communications interface monitor 40 to determine an online or offline status of the scale. Various techniques may be used to implement the communications interface monitor. For example, in a scale incorporating Windows software, Windows messaging within the scale may identify when there is a loss of connectivity. In another example the monitor may involve repeatedly pinging a Server IP Address to confirm that acknowledgment responses are received. In still another example, the monitor may involve repeatedly pinging a scale management PC IP address to confirm that an acknowledgment response is received. In yet another example, where the scale includes a web browser, a default browser homepage may be used to identify an IP address, and the monitor may repeatedly ping the identified IP address to confirm that an acknowledgment response is received. Other variations are possible as well depending upon the type of network connection and communications scheme used.

Figure 4:
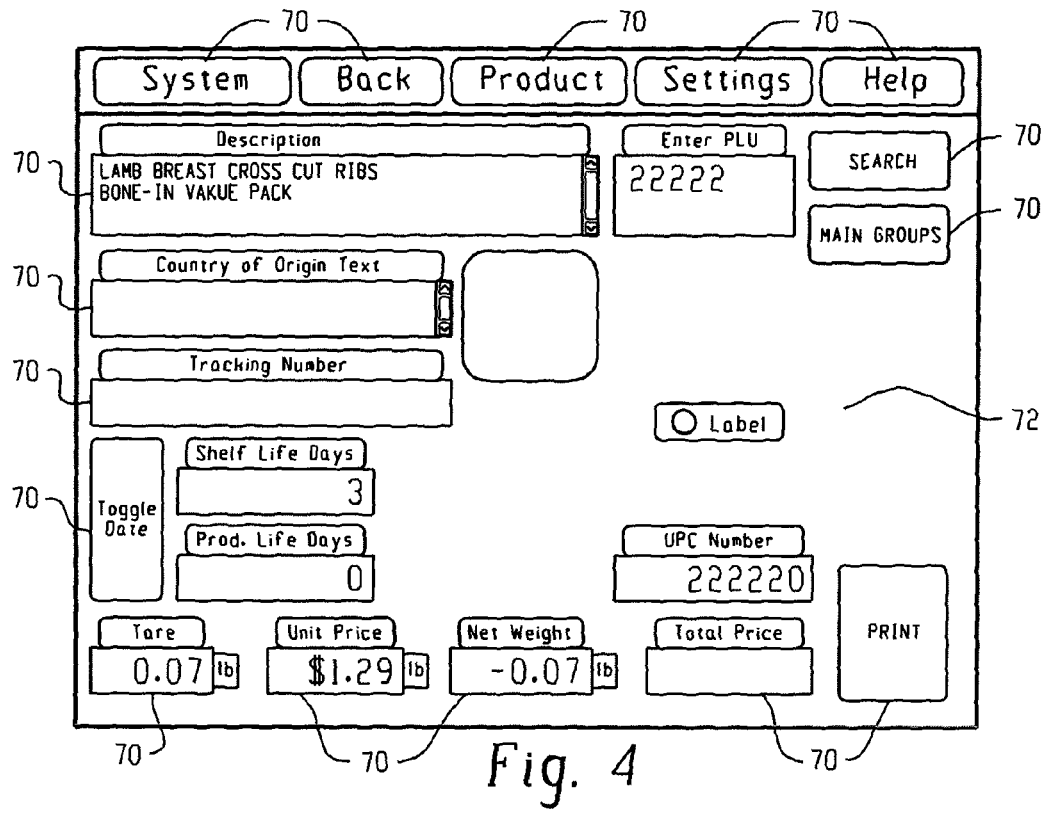
FIG. 4 is an exemplary interface display during a scale online condition.
Figure 5:
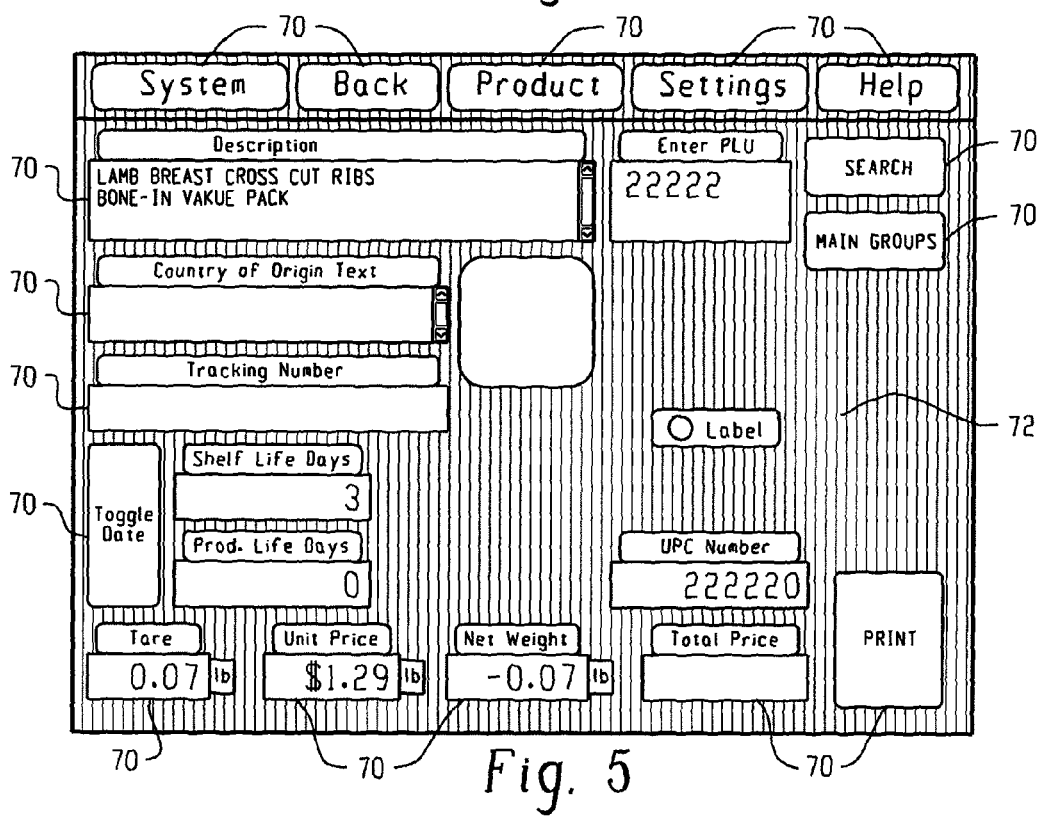
FIG. 5 is an exemplary interface display during a scale offline condition.

The online or offline status of the scale can be communicated to scale operators by making a color change on a selected portion or portions of the visual interface that is displayed. Referring to FIGS. 4 and 5, FIG. 4 shows an interface screen that is displayed while the scale is online and FIG. 5 reflects the same interface screen as displayed while the scale is offline. In FIG. 4 a plurality of user selectable image areas 70 are provided, some of which include associated text display windows. The image areas are displayed over the top of a background area 72, where the background area 72 has a common, online operating color (e.g., light blue). In FIG. 5, the background area 72 is display in a different, offline operating color (e.g., bright red) as represented by the diagonal lines in the background area 72. In the illustrated example, colors displayed in the image areas 70 are the same as between the online and offline display conditions. However, it is recognized that the colors displayed in those portions of the screen could be changed as well. Moreover, rather than changing the color of the background 72, the color of the image areas could only be changed.

Figure 6:
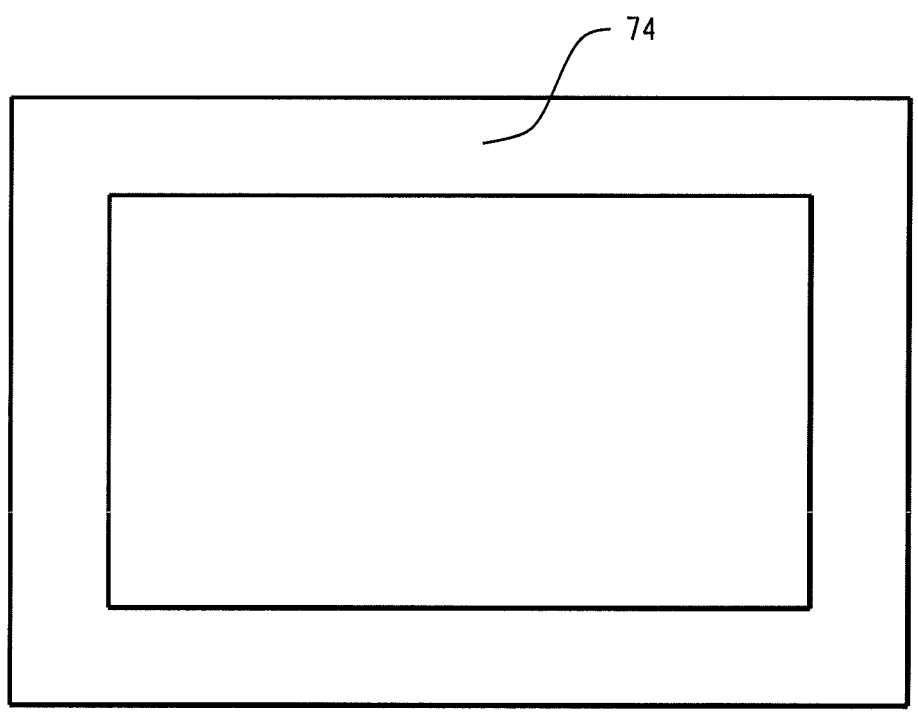
FIG. 6 is an exemplary interface display with a border area.

The desired result is to provide a color change that is visually obvious to scale operators. In the most preferred implementations the color change will be visually perceptible at a distance from the scale (e.g., from at least 20 feet away) so that store personnel can readily recognize the offline situation even if they are not standing at the scale in preparation for using the scale. In this regard, other variations are possible. For example, referring to FIG. 6 the displayed interface screen may be presented with a border 74 that changes colors as between the online and offline conditions of the scale. In some implementations the portion or portions of the user interface that is designated for a color change as between the online and offline conditions of the scale makes up at least 20% of the display screen area, more preferably at least 30% if the display screen area and still more preferably at least 40% of the display screen area. While the colors light blue and bright red are mentioned above for the color change, it is recognized that numerous variations are possible, provided the colors are selected with sufficient contrast to be visually obvious to scale operators. Moreover, the use of the term "color" herein is intended to encompass the entire visible color spectrum, as well as black, white and shades of gray. Further, while it is contemplated that the color change during the offline condition would be stable, it is recognized that the color change could instead be a "flashing" color change (e.g., the color of the background area 72 repeatedly changes back and forth between light blue and red during the offline condition). Moreover, such a flashing color condition feature could be implemented by repeatedly alternating between one or more color characteristics (i.e., hue, saturation and brightness). Additionally, the flashing condition could be implemented when a scale first goes offline until an operator recognizes the situation (e.g., as by closing the text box mentioned below) and thereafter the flashing condition could be discontinued in favor of a stable color change that remains in place as long as the scale remains offline.

In addition to producing a color change on one or more portions of the display during the offline condition, the controller may generate a message box on the display to advise the scale operator of the offline condition and provide information on how to proceed. By way of example, the message box may include text reading as:

The scale is no longer attached to the network.
This scale will no longer get pricing downloads.
Verify that the Ethernet cable is attached to the scale (try connecting and disconnecting the cable) or, if this is a wireless scale, make sure there is nothing blocking the scale from being able to see the access point.
Scale IP address=111.222.222.222

The generation of this message box may interrupt other interface functions of the scale, requiring the scale operator to close out the message box before proceeding with a weighing operation using the scale. In addition, even after the message box has been closed, if the scale remains in the offline condition for a certain period of time, the message box can be regenerated again. Repeated display of the message box in this manner during the offline condition of the scale may be more effective at causing the scale operator to attempt to correct the offline condition.

It is to be clearly understood that the above description is intended by way of illustration and example only and is not intended to be taken by way of limitation. For example, in addition to changing a color condition of the display, an audible indication could be provided, such as a beeping sound other tone. In some cases the audible indication could be used in place of the change in color condition of the display. Use of a flashing light on some other portion of the scale than the display screen might also be used to indicate the offline condition. Other changes and modifications could be made.

What is claimed is:

1. In connection with a food product scale located in a store, the scale including a weighing station having an associated mechanism for producing weight indicative signals, and an operator interface screen including at least one color display, the scale including a communications interface for communicating with another computer device via a network, a method of providing a scale operator with an indication that the scale has gone offline of the network and thus no longer has a communications link to receive information from the computer device, the method comprising the steps of:
    the scale automatically determining its online or offline status by monitoring the communications interface, wherein the monitoring is achieved by one or more of:
        utilizing Windows messaging within the scale to identify when there is a loss of connectivity; or
        the scale repeatedly pinging a Server IP Address; or
        the scale repeatedly pinging a scale management PC IP address; or
        the scale includes a web browser and a default browser homepage is used to identify an IP address, and repeatedly pinging the identified IP address;
    while the scale is online, presenting a portion of an operator interface via the operator interface screen in a first color;
    while the scale is offline of the network, presenting the portion of the operator interface via the operator interface screen in a second color that is different than the first color.

2. The method of claim 1 wherein the operator interface is presented as a background with interface indicia thereon:
    while the scale is online, the portion of the operator interface presented in the first color is the background;
    while the scale is offline of the network, the portion of the operator interface presented in the second color is the background.

3. The method of claim 1 wherein the operator interface screen comprises a touch screen display, the operator interface is presented as a background with operator selectable image areas thereon:
    while the scale is online, the portion of the operator interface presented in the first color is one of the background or the selectable image areas;
    while the scale is offline of the network, the portion of the operator interface presented in the second color is the same one of the background or the selectable image areas.

4. The method of claim 1 wherein:
    while the scale is offline of the network, a message box is displayed advising the operator that the scale is offline.

5. The method of claim 4 wherein an operator can close the message box.

6. The method of claim 1 wherein the portion of the operator interface for which change from the first color to the second color occurs as between the online and offline conditions of the scale comprises at least 30% of the area of the display.

7. The method of claim 1 wherein the portion of the operator interface for which change from the first color to the second color occurs as between the online and offline conditions of the scale comprises at least 40% of the area of the display.

8. In connection with a food product scale located in a store, the scale including a weighing station having an associated mechanism for producing weight indicative signals, and an operator interface screen including at least one color display, the scale including a communications interface for communicating with another computer device via a network, a method of providing a scale operator with an indication that the scale has gone offline of the network and thus no longer has a communications link to receive information from the computer device, the method comprising the steps of:
    the scale automatically determining its online or offline status by monitoring the communications interface;
    while the scale is online, presenting a portion of an operator interface via the operator interface screen in a first color;
    while the scale is offline of the network, presenting the portion of the operator interface via the operator interface screen in a second color that is different than the first color;
    while the scale is offline of the network, a message box is displayed advising the operator that the scale is offline, wherein an operator can close the message box;
    wherein, after the message box has been closed, and if the scale remains offline for a certain time period, the message box is displayed again.

9. In connection with a food product scale located in a store, the scale including a weighing station having an associated mechanism for producing weight indicative signals, and an operator interface screen including at least one color display, the scale including a communications interface for communicating with another computer device via a network, a method of providing a scale operator with an indication that the scale has gone offline of the network and thus no longer has a communications link to receive information from the computer device, the method comprising the steps of:
    the scale automatically determining its online or offline status by monitoring the communications interface;
    while the scale is online, presenting a portion of an operator interface via the operator interface screen in a first color;
    while the scale is offline of the network, presenting the portion of the operator interface via the operator interface screen in a second color that is different than the first color;
    wherein the portion of the operator interface for which change from the first color to the second color occurs as between the online and offline conditions of the scale comprises at least 20% of the area of the display.

10. A method of alerting scale operators within a store that a food product pricing scale is in an offline condition in which the scale is unable to receive product pricing updates as opposed to an online condition in which the scale is able to received product pricing updates, where the scale includes a weighing station having an associated mechanism for producing weight indicative signals, and an operator interface screen including at least one color display, the scale including a communications interface for communicating with another computer device, the method comprising the steps of:
    changing a color condition of at least a portion of the color display as between online and offline conditions of the scale;

wherein the color condition is displayed color of a background portion of the display and the change of color condition can be viewed by an operator from at least twenty feet away.

11. The method of claim 10 wherein the changing of the color condition involves changing a color that is displayed on at least 20% of the area of the display.

12. The method of claim 10 wherein the changing of the color condition involves changing a color that is displayed on at least 30% of the area of the display.

13. The method of claim 10 wherein the changing of the color condition involves changing a color that is displayed on at least 40% of the area of the display.

14. The method of claim 10 wherein the changing of the color condition further involves implementing a flashing screen feature during offline conditions.

* * * * *